United States Patent [19]
Haaksman

[11] Patent Number: 5,374,820
[45] Date of Patent: Dec. 20, 1994

[54] LENS SYSTEM WITH MOVABLE MAGNIFIERS

[75] Inventor: Ernst J. Haaksman, Bussum, Netherlands

[73] Assignee: Schmidt Optiek B.V., Amsterdam, Netherlands

[21] Appl. No.: 949,234
[22] PCT Filed: May 3, 1991
[86] PCT No.: PCT/NL91/00076
§ 371 Date: Nov. 4, 1992
§ 102(e) Date: Nov. 4, 1992
[87] PCT Pub. No.: WO91/17465
PCT Pub. Date: Nov. 14, 1991

[30] Foreign Application Priority Data

May 4, 1990 [NL] Netherlands .................. 9001084

[51] Int. Cl.$^5$ .................................................. G02C 1/00
[52] U.S. Cl. .................................. 250/201.6; 351/158
[58] Field of Search ............... 250/201.6; 351/41, 158, 351/209, 210, 666; 356/1, 4; 359/372, 374, 379, 380, 481

[56] References Cited

U.S. PATENT DOCUMENTS

| | | | |
|---|---|---|---|
| 4,195,918 | 4/1980 | Freche et al. | 351/151 |
| 4,659,922 | 4/1987 | Duncan | 250/222.1 |
| 4,834,525 | 5/1989 | Vansaghi | 351/158 |
| 4,852,988 | 8/1989 | Velez et al. | 351/158 |
| 4,929,075 | 5/1990 | Eliakim | 351/158 |
| 5,109,161 | 4/1992 | Horiuchi et al. | 250/201.6 |
| 5,200,602 | 4/1993 | Ikebe et al. | 250/201.6 |

Primary Examiner—David C. Nelms
Assistant Examiner—S. B. Allen
Attorney, Agent, or Firm—George A. Skoler

[57] ABSTRACT

A lens system comprising a frame that fixes to a head of a user of the lens system. Associated with the system are first and second magnifiers that are movable with respect to each other and with respect to the frame. The first and second magnifiers have respective oculars and objectives. The magnifiers are associated with a distance measuring means for measuring the distance from the user to an object to be viewed by the user. They provide a connected control unit with a signal representative of the distance. Driving means connected to the control unit are provided. The control unit provides the driving means with a control signal in response to the signal received from the distance measuring means. There are first displacement transferring means connected to the driving means for displacing the objectives with respect to the first and the second ocular. The focal length of each magnifier is adapted to the distance measured by the distance measuring means. The object can be sharply viewed by the user by means of each of the magnifiers. The second displacement transferring means is arranged functionally for displacing the first and second magnifiers with respect to each other and with respect to the frame in response to a signal provided by the distance measuring means in such a manner that the optical axes of the magnifiers which extend substantially through the optical center of the relevant eye, intersect each other at the distance measured by the distance measuring means.

84 Claims, 9 Drawing Sheets

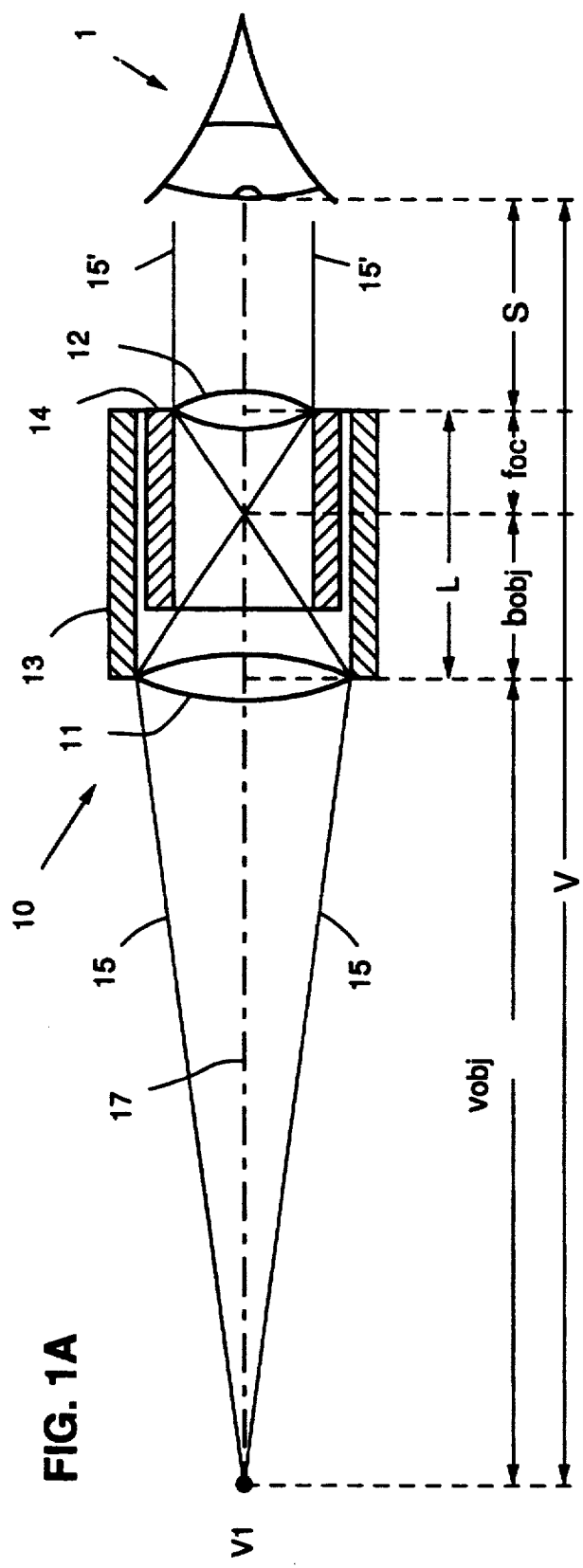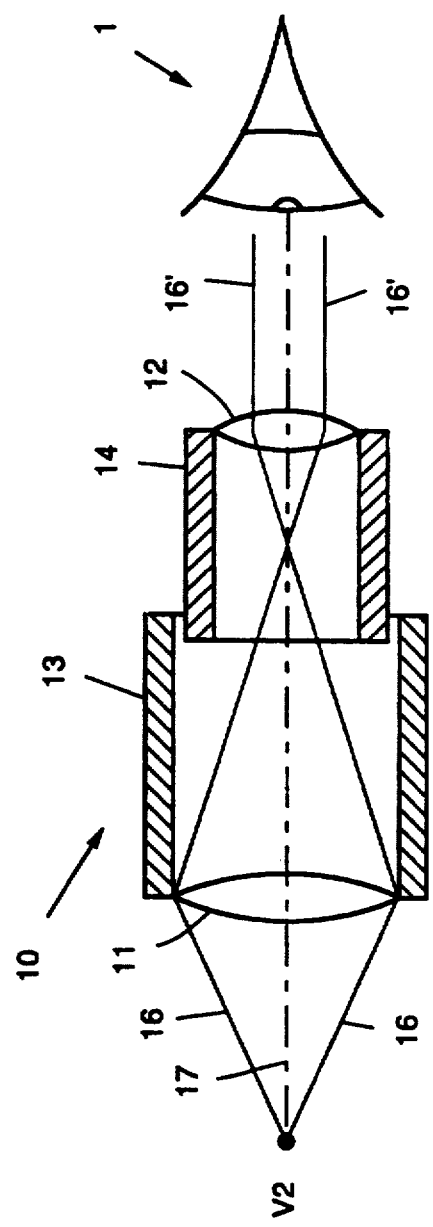
FIG. 1A
FIG. 1B

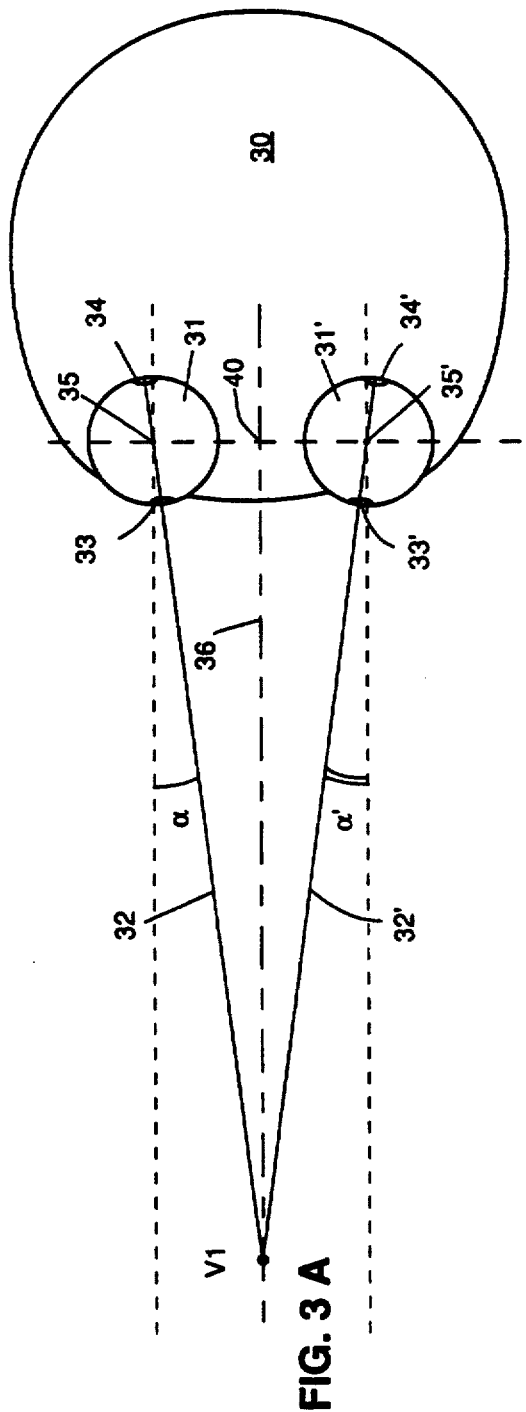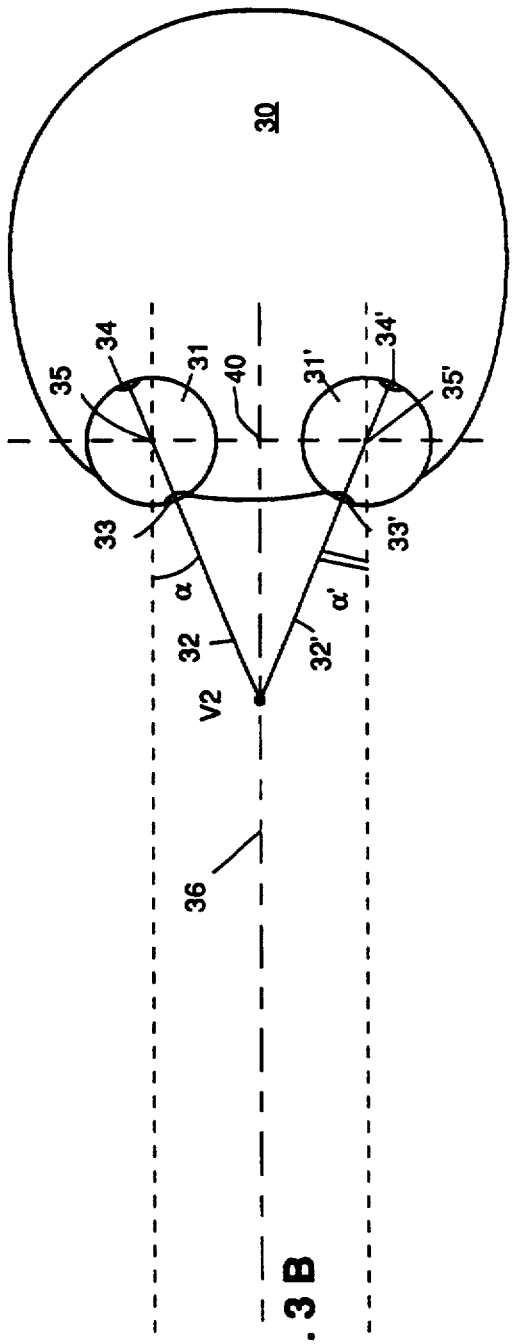

LENS SYSTEM WITH MOVABLE MAGNIFIERS

This invention relates to a lens system to be fixed to the head of a user, comprising:
a first magnifier having a first ocular and a first objective;
a second magnifier having a second ocular and a second objective; the first magnifier and the second magnifier being attached to a frame, this frame being adapted for being fixed to the head of the user of the lens system; distance measuring means for measuring the distance from the user to an object to be viewed by the user; a control unit connected to the distance measuring means, said distance measuring means providing the control unit with a signal representative of the said distance; driving means connected to the control unit, said control unit providing the driving means with a control signal in response to the signal received from the distance measuring means; and first displacement transferring means connected to the driving means for displacing the first and the second objective with regard to respectively the first and the second ocular in such a manner that the focal length of each magnifier is adapted to the distance measured by said distance measuring means so that the relevant object can be sharply viewed by the user by means of each of said magnifiers.

Such a lens system is known from U.S. Pat. No. 4,865,438. The lens system described therein is intended to always allow the user to automatically have a sharp view of an object to be viewed, regardless of the distance and without requiring manual adjustment of the glasses by the user. An example of a user receiving benefit from such glasses is a surgeon carrying out an operation.

In the following passages the term "adaptation of the focal length of a magnifier to a specific distance" means that the magnifier is adjusted in such a manner that the relevant object can be sharply viewed by the user by means of the magnifier. Preferably, the magnifier is then focussed on said distance, i.e. the focal distance of the magnifier is equalled to the distance of the magnifier to the relevant object. Physically this means that with respect to the associate ocular the objective is adjusted in such a manner that the beams of light reaching the objective leave the magnifier via the ocular in parallel with each other when said beams of light originate from a point remote from the magnifier over the directional distance. This has the advantage that the user can sharply view objects located at the directional distance with an unaccommodated eye, which is less trying than sharply viewing with an accommodated eye. The magnification obtained depends on the power of the employed ocular and the employed objective, respectively.

It is a drawback of the known lens system that the orientation of the magnifiers is constant, as a result of which the known lens system is in principle only suitable for viewing an object at one specific place, said place corresponding to the point of intersection of the optical axes of the two magnifiers. When the object is not located at said point of intersection, i.e. is located closer to or more remote from said point of intersection, the images both magnifiers form of the object are different and the brains must take "trouble" to translate the information presented to both eyes into a single sharp image, which is trying to the user. The more remote the object is from said place, i.e. is located closer to or more remote from said point of intersection, the greater is the extent to which the above phenomenon occurs. Outside a specific margin with respect to said point of intersection, the user will always view two different images overlapping each other.

The object of this invention is to provide a device that does not show these drawbacks. In particular, it is an object of this invention to provide a device with which it is possible to always view objects located at an arbitrary and/or variable distance with respect to the user with an unaccommodated eye in magnified and stereoscopically sharp condition. Since when sharply viewing an object with two eyes the optical axes of the eyes converge toward the object through an inwardly swivelling movement of the eyes, said inwardly swivelling movement of the eyes being larger as the object is closer to the viewer, it is advantageous when the magnifiers follow this movement of the eyes in the same manner.

For this purpose a lens system according to this invention is constructed in such a manner that the first and second magnifiers are movable with respect to each other and with respect to the frame; and that second displacement transferring means are arranged for displacing the first and second magnifiers with respect to each other and with respect to the frame in response to said signal provided by said distance measuring means in such a manner that the optical axes of the magnifiers, each of which axes always extends substantially through the optical centre of the relevant eye, intersect each other at the distance measured by said distance measuring means.

This ensures that the optical axis of each magnifier always coincides with the optical axis of the relevant eye so that the eye can be directed in a "natural" manner to the object to be viewed. It is further achieved with the lens system according to this invention that the user need not accommodate while notwithstanding he views sharply and in magnified and stereoscopic condition.

It is advantageous here to carry out this converging movement of the magnifiers in such a manner that the distance of each ocular to the relevant eye is kept substantially constant.

In general it applies that the closer an object is to the viewer, the lower the position of the eyes viewing this object with respect to the horizontal. The eyes rotate downwards with respect to the head. It is therefore advantageous when the converging movement of the magnifiers is combined with a movement of the magnifiers rotating downwards with respect to the fixing means.

In a preferred embodiment of the lens system according to this invention the control unit is so designed that upon focussing the momentary convergence distance decreases to the desired convergence distance. This ensures that when some hysteresis occurs the adjusted convergence distance exceeds the desired distance, which is less trying to the eye than when the adjusted convergence distance would be less than the desired distance.

It is possible to provide the lens system with individual driving means and displacement transferring means for focussing and with individual driving means and displacement transferring means for converging the two magnifiers. The two driving means are then each individually controlled by the control unit while the correlation of the two movements is achieved by the control unit.

Since the assembly is to be worn on the user's head, it may be desirable to give the lens system a lower weight. Preferably, therefore, the lens system has common driving means for the focussing displacement and the converging displacement, respectively.

In one embodiment the displacement transferring means for focussing and the displacement transferring means for converging are separately connected to the driving means. The correlation of the two displacements is then achieved by the individual displacement transferring means.

Preferably, the displacement transferring means for converging are directly connected to the driving means and the displacement transferring means for focussing are designed to derive the axial movement of the objective with respect to the ocular required for focussing from the converging angular displacement of the magnifiers.

It is known that the eye separation is different from person to person. The most frequently occurring eye separations are within the range of from 58 mm to 71 mm. In a further preferred embodiment of the lens system according to this invention the mutual distance of the two magnifiers is therefore adjustable, preferably within the range of from 58 mm to 71 mm, so that the glasses can be used by several persons while it is also more advantageous from a viewpoint of manufacturing technique that no "glasses-to-size" need to be made, but that within said range the manufacture of one basis product is sufficient.

In order to fix the lens system according to this invention firmly to the user's head, the fixing means may comprise a glasses frame. When the lens system is too heavy to fix it firmly to the user's head in a comfortable manner by means of a glasses frame, the fixing means preferably comprise a headband.

Since the magnifiers must be fixed firmly to the head free from vibrations in a specific position while said position must be variable in accordance with the variable distance to the object to be viewed, the driving means may comprise a DC motor and a sensor, but preferably the driving means comprise a servomotor.

According to the invention an ultrasonic transmitter and an ultrasonic receiver can be used advantageously for the distance measuring means because an ultrasonic transmitter and receiver combination directly provides a measure for the distance of the object to be viewed.

It is further advantageous in this connection when the ultrasonic transmitter and the ultrasonic receiver are movable with respect to each other and with respect to the fixing means and that the movements of the ultrasonic transmitter and the ultrasonic receiver are connected to the movements of the first and the second magnifier.

Preferably, the ultrasonic transmitter is mounted to one of the two magnifiers and the ultrasonic receiver is mounted to the other of the two magnifiers.

According to the invention a light transmitter and a light receiver may also be used advantageously for the distance measuring means. This has the further advantage that when using light the area of measurement may be much narrower than when using ultrasonic sound.

The light employed may be infrared light or visible light, the use of visible light having the advantage that the user of the system according to the invention can see on what object there is focussed.

The receiver-transmitter combination can then be used in the same manner as described above with respect to the ultrasonic distance detector, namely the measurement of the distance and the generation of a distance representing signal for the control unit. However, according to the invention it is also quite possible to directly check whether the adjusted convergence distance is the correct one, rather than first measure the distance to the object to be measured and then calculate in the control unit what position of the magnifiers belongs thereto. For this purpose a source of light connected to one of the magnifiers is designed in an embodiment according to the invention to project a light spot to an object to be viewed and a light detector is connected to the other of the two magnifiers, with the control unit being designed to control the driving device in such a manner that a signal obtained from the detector is indicative of the condition that the detector is directed towards the light spot. In that case the two magnifiers are also directed correctly.

Preferably, the device comprises two detectors mounted in parallel with each other and the control unit comprises a difference measuring means for measuring the difference of the light intensities of both detectors. When both detected light intensities are similar to each other, the convergence is correct. For this purpose the control unit further comprises a control circuit for displacing the two magnifiers in such a manner that the detected difference intensity is substantially zero. Thus it is achieved in any case that the convergence of the two magnifiers is correctly adjusted.

When, e.g. owing to mechanical play and/or tolerance, the adjusted sharpness is not quite correct, this is no great drawback, on the one hand, because a not quite correctly adjusted sharpness is experienced by the eye as less unpleasant and/or trying than a not quite correctly adjusted convergence and, on the other hand, because, within the most frequently occurring range of application of from 0 to 3 m, a deviation in the mechanical adjustment does not greatly influence the effectively adjusted sharpness distance.

In order to eliminate the influence of ambient light, the receiver may be provided with a filter. It is also possible to use pulsated light, with a difference measurement being conducted in the receiver or by the control means between the detected light in the situation "puls on" and the detected light in the situation "puls out", respectively.

In the following passages this invention will be further explained by means of a description of a preferred embodiment of the device according to the invention with reference to the accompanying drawings, of which:

FIGS. 1A–1B diagrammatically shows the operation of a magnifier;

FIG. 2 is a diagram of the relation between the distance L from the ocular to the objective and the object distance V;

FIGS. 3A–3B diagrammatically shows the convergence of the visual axes when stereoscopically viewing;

FIG. 4 is a diagram of the relation between the angle of displacement $\alpha$ of the eye and the measured distance $V_g$;

FIG. 5 diagrammatically shows the path followed by an ocular and an objective of a magnifier in a lens system according to the invention;

Figure 2:
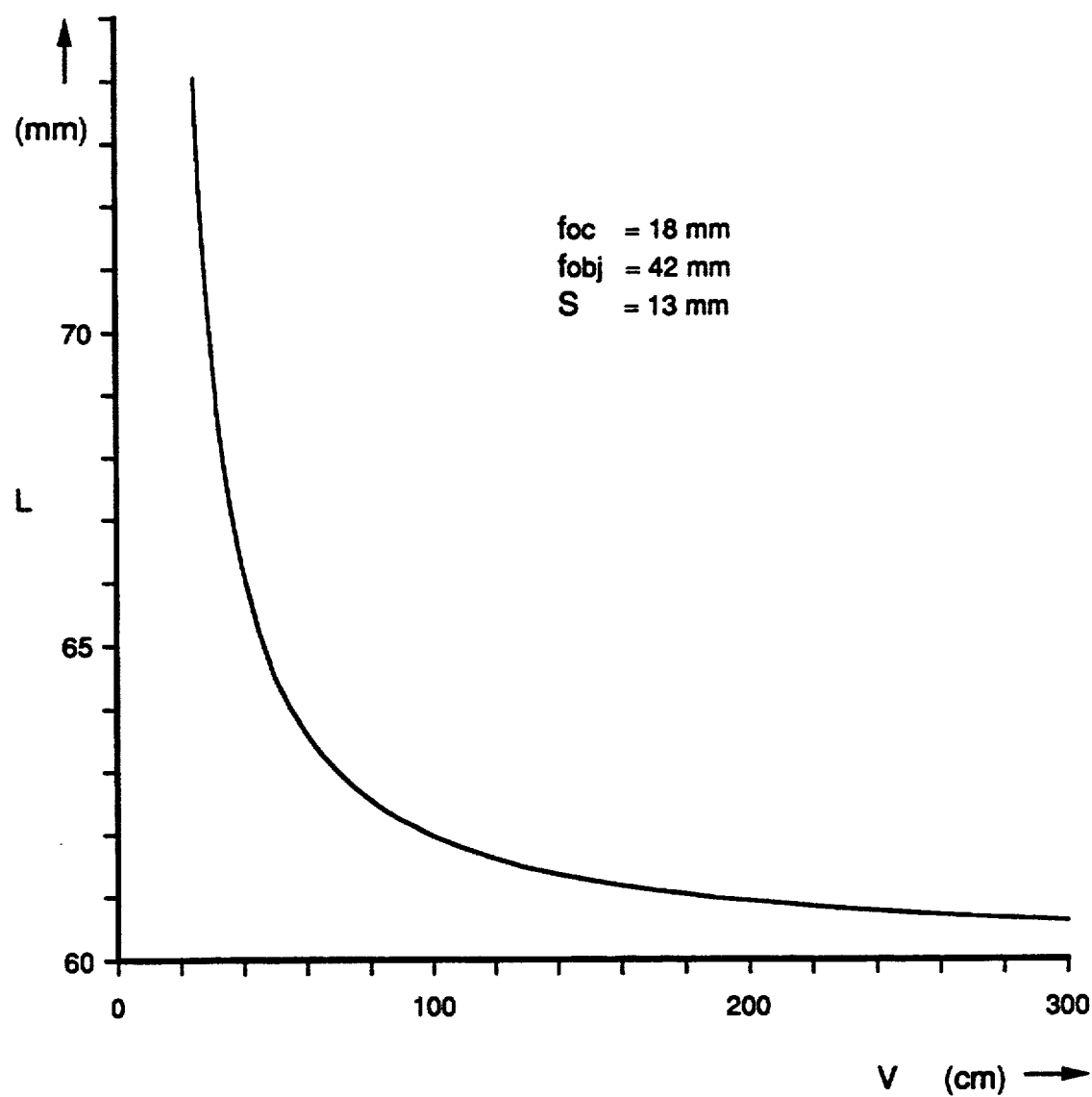

FIG. 1 is a diagrammatic cross-sectional view of an eye 1 and a magnifier 10. The magnifier comprises a first lens 11, the objective, and a second lens 12, the ocular, which are mounted in an objective holder 13 and an ocular holder 14, respectively. Provided between the two lenses 11 and 12 is an image reversal device, not shown for clearness' sake. By L is indicated the distance between the two lenses measured along the optical axis 17 of the magnifier formed by the coincident optical axes of each individual lens and extending through the optical centre, not shown, of the eye 1. The objective holder 13 and the ocular holder 14 are movable with respect to each other in such a manner that the objective 11 and/or the ocular 12 is moved along its optical axis, thus changing the distance L.

FIG. 1A depicts the situation occurring when viewing a remote object V1; FIG. 1B depicts the situation occurring when viewing a near object V2. Beams of light 15 and 16 originating from the objects V1 and V2, respectively, and reaching the objective 11 are deflected by the objective 11 and the ocular 12 at a suitable distance L in such a manner that the corresponding emerging beams of light 15' and 16', respectively, leave the ocular in parallel with the optical axis 17 so that they can be viewed by the unaccommodated eye 1.

The distance L required for this can be calculated when the distance V from the object V1 or V2 to the eye 1 is known, by means of the following formulae:

$$\frac{1}{f_{obj}} = \frac{1}{b_{obj}} + \frac{1}{v_{obj}} \quad (1)$$

$$f_{oc} + b_{obj} + v_{obj} = V - S \quad (2)$$

wherein:

$v_{obj}$ is the distance from the object V1 or V2 to the objective 11:

$b_{obj}$ is the distance from the image point of V1 or V2 to the objective 11;

$f_{obj}$ is the focal distance of the objective 11; and

S is the distance from the coular 12 to the eye 1.

From the formulae (1) and (2) the distance $L = f_{oc} + b_{obj}$ can be calculated. This distance is, for a given magnifier with given $f_{oc}$ and $f_{obj}$, a one-valued function of V for a constant of S. FIG. 2 is a diagram of the relation between L and V, for a magnifier with $f_{oc} = 18$ mm and $f_{obj} = 42$ mm, wherein the magnifier is kept at a distance $S = 13$ mm from the eye, which distance, in practice, proves to give an optimum image to most people.

The following definitions will apply below:

optical centre: the point located within the eye and fixed with respect to the head through which the optical axis of the eye always extends, regardless of a rotation of the eye;

point of symmetry: the point exactly halfway the two optical centres;

plane of symmetry: the plane through the point of symmetry which is perpendicular to the connecting line of the two optical centres;

line of view: the connecting line between the point of symmetry and the object to be viewed;

plane of view: the plane set up through the line of view and the connecting line of the two optical centres.

In general, it is found relaxant when the head is kept in such a position with respect to the object to be viewed that the plane of view extends obliquely downwards at an angle which is greater as the object to be viewed is closer to the head.

FIG. 3 diagrammatically shows that when stereoscopically viewing an object V1 to be viewed remote in the plane of symmetry (FIG. 3A) or an object V2 near in the plane of symmetry (FIG. 3B) both eyes 31,31' of a viewer are moved with respect to each other in such a manner that the optical axes 32,32' of each eye 31,31' connecting the eye lens 33,33' with the fovea 34,34' intersect each other at the object V1 or V2. The optical centres 35,35' will then remain at the same place with respect to the head 30. It may be clear that the angle $\alpha,\alpha'$ through which the eyes 31,31' are rotated inwards is larger as the object V1 or V2 is closer to the head 30. More in particular, the angle $\alpha,\alpha'$ is a one-valued function of the distance $V_g$ from the object V1 or V2 to the point of symmetry 40.

Figure 4:
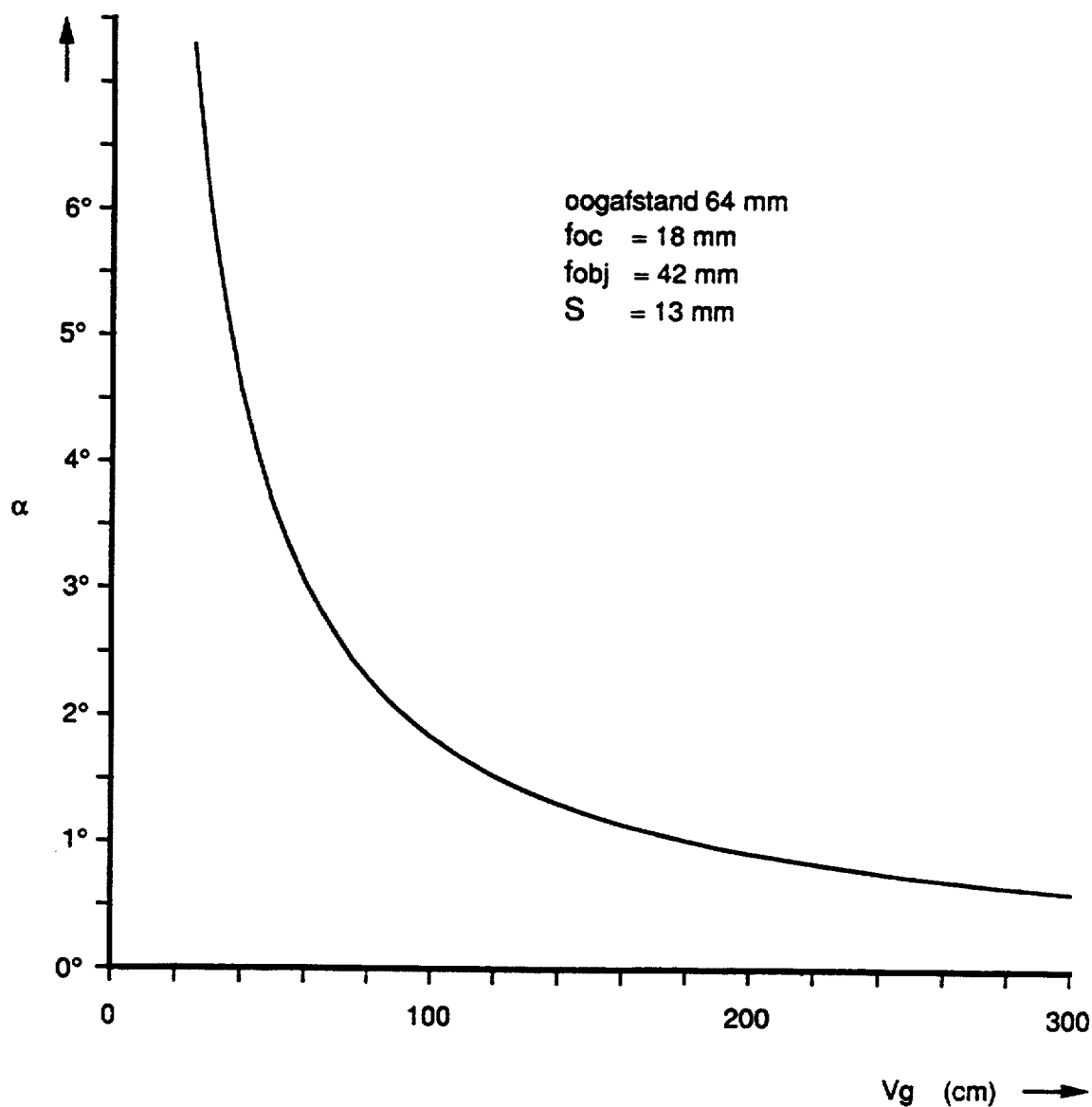

FIG. 4 is a diagram of the relation between $\alpha$ and $V_g$ for a person whose eye separation OA is 64 mm (measured between the optical centres).

Figure 5:
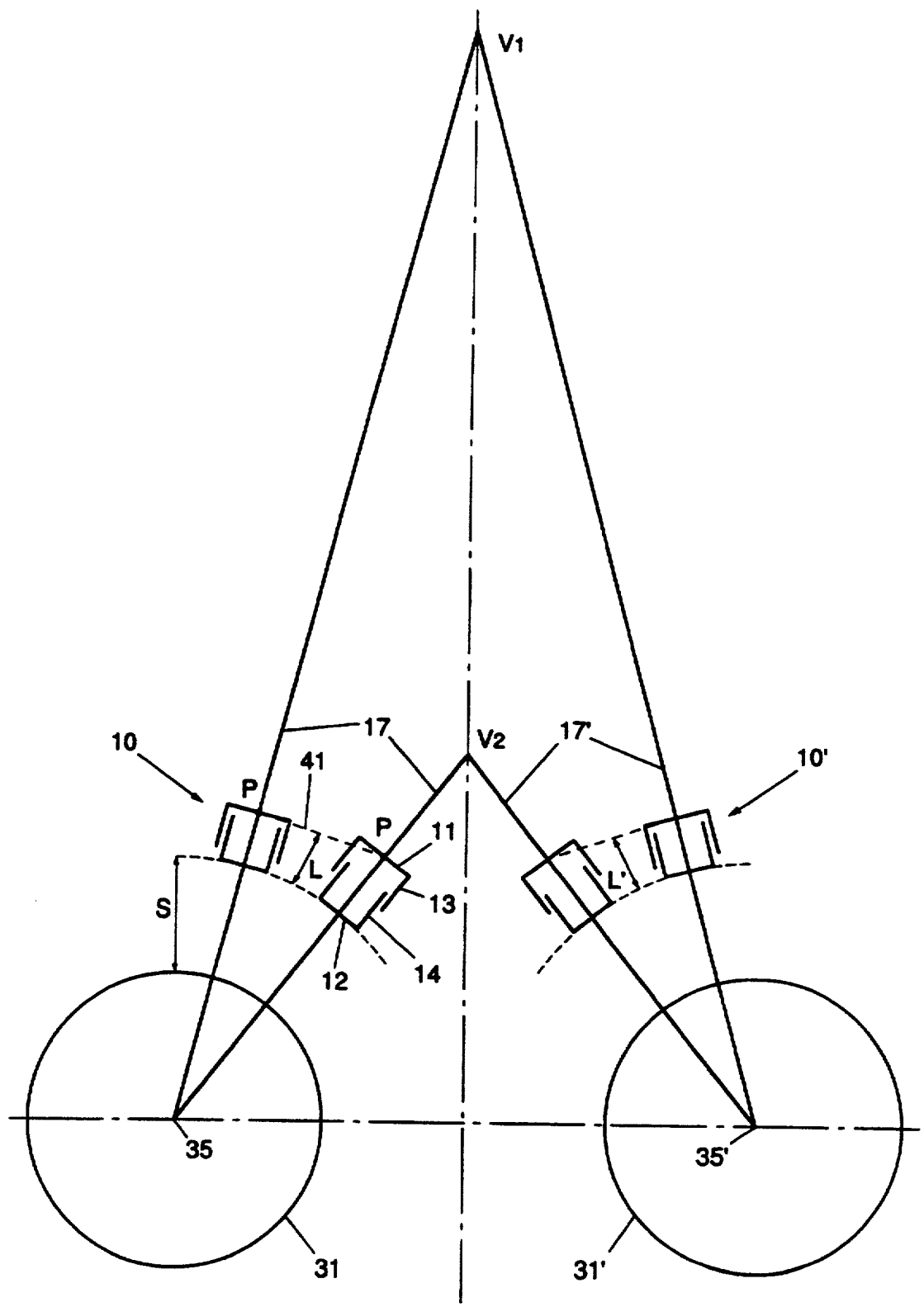

In general, the accommodating adaptation of the eye lens 33,33' is connected to the converging rotation of the eyeball. FIG. 5 diagrammatically shows, and not scaled, how a lens system moves together with the converging rotation of the eyeball upon focussing.

It will always apply here that:

1) the distance L,L' from the objective 11,11' to the ocular 12,12' is such that a focal point of the magnifier 10,10' is located at the object V1 or V2;

2) the optical axis 17,17' of each magnifier 10,10' extends substantially through the relevant optical centre 35,35' of the eye 31,31'; and 3) the optical axes 17,17' of the two magnifiers 10,10' always intersect each other substantially at the object V1 or V2.

From the characteristic 1) it follows that in response to the detection of a distance $V_g$ to the object to be viewed the objective must be moved with respect to the associate ocular in such a manner that the movement L satisfies the diagram of FIG. 2. The distance V from the object V1 or V2 to the eye is then related to the measured distance $V_g$ from the object V1 or V2 to the point of symmetry 40, according to the formula:

$$V + d = \sqrt{V_g^2 + \left(\frac{1}{2} OA\right)^2}$$

wherein d is the distance from the front side of the eye to the optical centre of the eye and OA is the eye separation.

From the characteristic 3) it follows that in response to the detection of a distance $V_g$ to the object to be viewed each magnifier must be rotated about said point of rotation in such a manner that the angle of rotation $\alpha$ satisfies the diagram of FIG. 4.

Preferably, the distance S from the ocular 14 to the eyeball is kept constant, as shown in FIG. 5. It has been found that the path 41 traversing an arbitrary point P of the objective can be excellently approached by a circle portion.

Figure 6A:
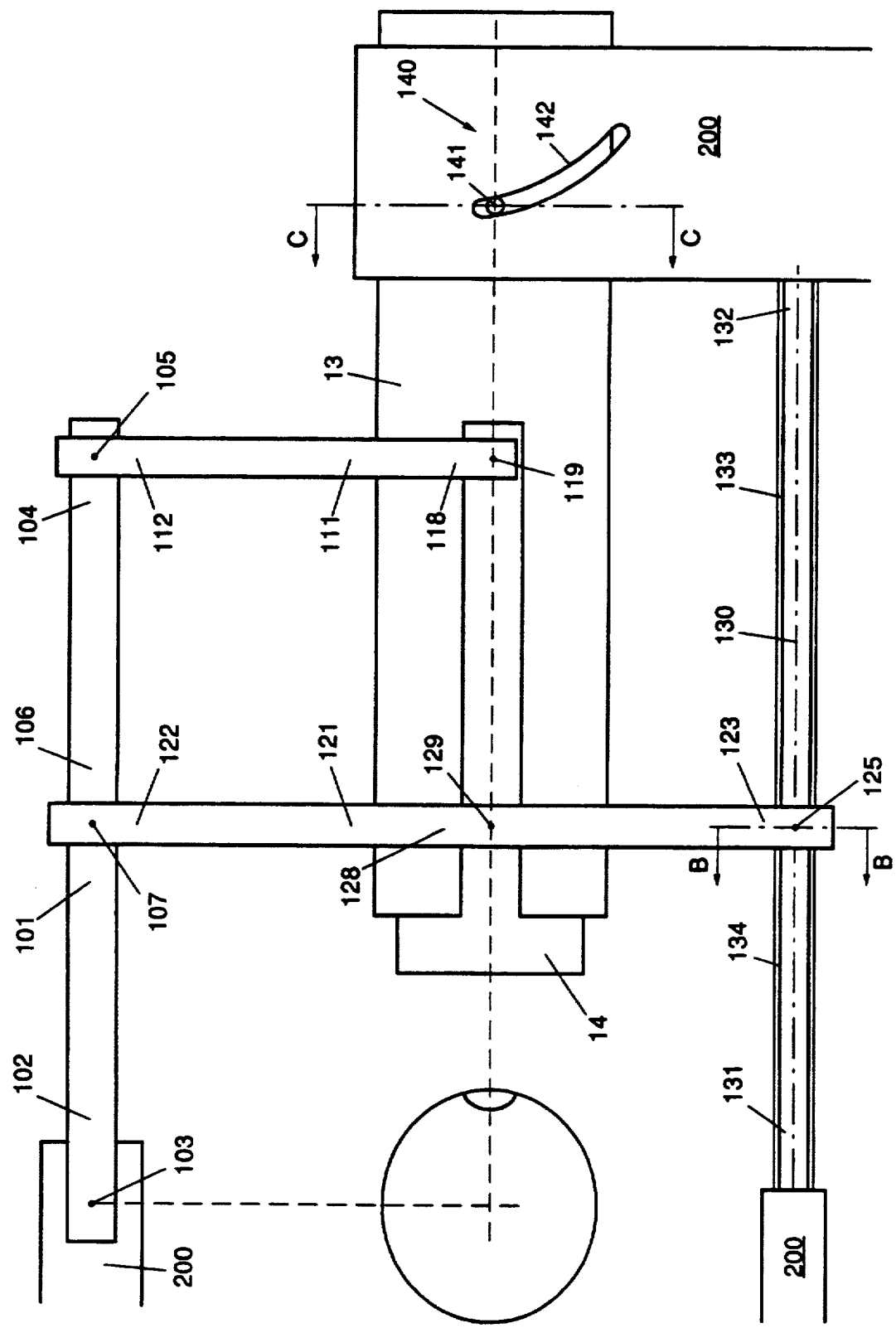
FIG. 6A is a top view of a preferred embodiment of the lens system according to the invention.
Figure 6B:
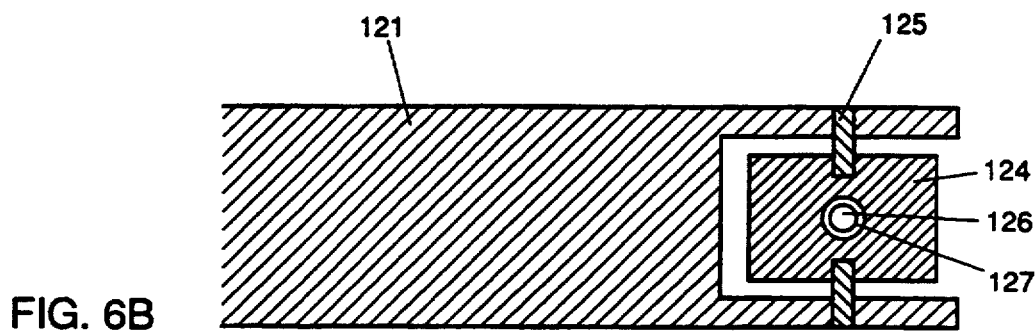
FIG. 6B is a cross-sectional view taken along the line B—B in FIG. 6A.
Figure 6C:
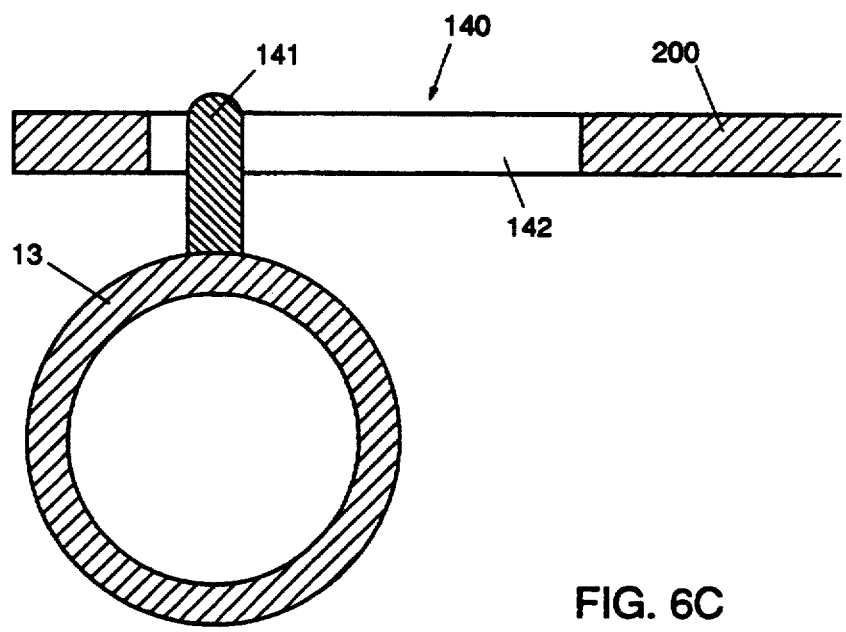
FIG. 6C is a cross-sectional view taken along the line C—C in FIG. 6A.

An embodiment of the lens system according to the invention is shown in FIG. 6, in which, for clearness' sake, only one half of the lens system is given. It will be clear that the lens system is substantially symmetrical and that the description is equally applicable to the half of the device not shown.

A first swing arm 101 is pivoted at one end 102 thereof about a pivot axis 103 on a frame 200 fixed firmly to the user's head in such a manner that the pivot axis 103 is perpendicular to the chosen plane of view and intersects the connecting line of the optical centres.

At the other end 104 of the first swing arm 101 one end 112 of a second swing arm 111 is pivoted about a pivot axis 105 which is parallel in direction with the pivot axis 103. At an intermediate part 106 of the first swing arm 101 one end 122 of a third swing arm 121 is pivoted about an axis 107 which is likewise parallel in direction with the axis 103. The other end 123 of the third swing arm 121 is fixed to a fixing shaft 130 provided with a screw thread 134, said fixing shaft at both ends 131,132 being mounted rotatably about its longitudinal axis 133 on the frame 200. The longitudinal axis 133 of the fixing shaft 130 extends along the line of view and the fixing shaft 130 is rotatable by a driving motor via connecting pieces not shown.

As a result of rotation of the fixing shaft 130 the end 123 of the third swing arm 121 is moved along the longitudinal axis 133 of the fixing shaft 130. For this purpose the third swing arm 121 is provided with a guide member 124 (see FIG. 6B) which is pivotable about an axis 125 parallel in direction with the axis 103. The guide member 124 is provided with a bore 126 with a screw thread 127 corresponding with the screw thread 134. The other end 118 of the second swing arm 111 and an intermediate part 128 of the third swing arm 121 are pivoted about axes 119 and 129, respectively, to the ocular holder 14, said axes 119 and 129 being fixed to the ocular holder 14 in such a manner that the distance between the axes 119 and 129 is equal to the distance between the axes 105 and 107 and that the plane set up through these axes extends through the optical centre of the eye.

When the shaft 130 is rotated by the driving motor, the guide member 124 is moved along the longitudinal axis 133 of the shaft 130. The first swing arm 101 will thereby pivot about the axis 103, resulting in that the ocular holder 14 will be turned via the swing arms 111 and 121 in the plane of view around the optical centre. The objective holder 13 has sliding connection with the ocular holder 14 substantially free from play and is thereby also pivoted about the axis 103.

The objective holder 13 is further provided with a guide pin 141 which is guided free from play through a guide slot 142 of an objective guide member 140 (see FIG. 6C), which is fixed firmly to the frame 200. The shape of the guide slot is defined in pole coordinates by the formula $$R(\Phi) = R_O + U(\Phi)$$

the centre of the pole coordinate system coinciding with the optical centre of the relevant eye so that upon inward displacement of the ocular holder 14 and the objective holder 13 through an angle $\alpha$, the objective holder 13 will be displaced with respect to the ocular holder 14 through a distance U corresponding to the angle $\alpha$, as described above.

Thus, in the embodiment shown in FIG. 6 the displacement transferring means for converging (101,111,121) are directly connected to the driving means (motor, 130) while the displacement transferring means for focussing (141,142) derive the axial movement of the objective 13 with respect to the ocular 14 from the angular displacement of the magnifier 10 with respect to the frame 200.

Figure 7:
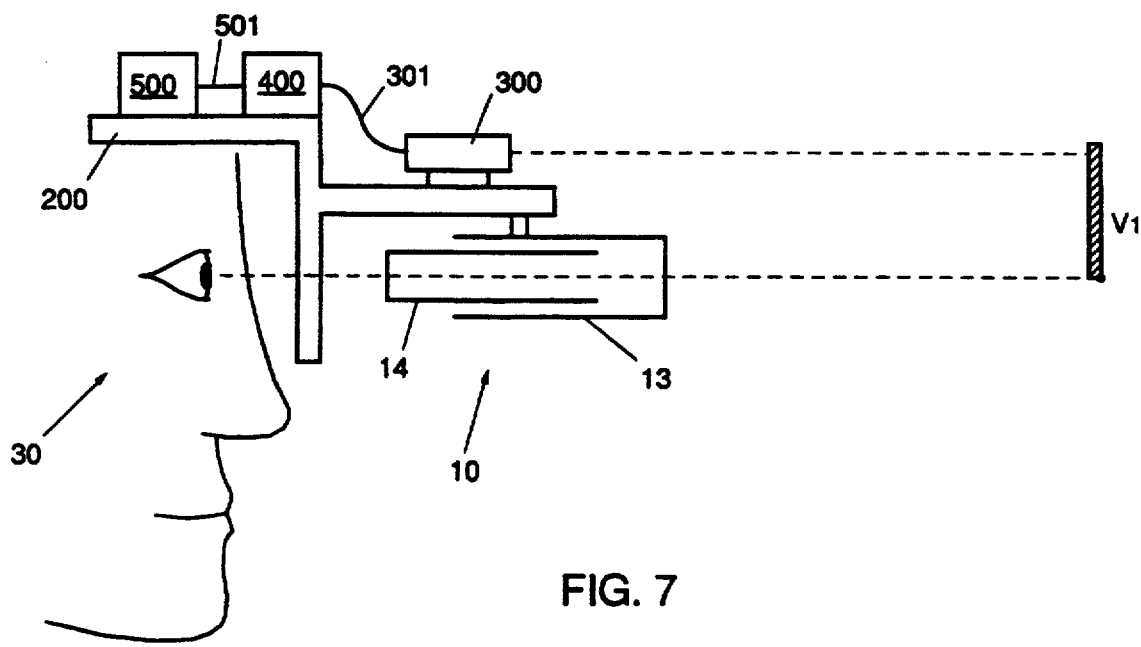
FIG. 7 is a diagrammatic view of the control of the magnifiers.

FIG. 7 is a diagrammatic side view of a frame 200 which is suitably fixed to the head 30, e.g. by a glasses frame or a headband (not shown). Fixed to the frame are the magnifiers 10, e.g. in the manner as described above.

Moreover, a known per se ultrasonic transmitter-receiver 300 is fixed to the frame 200. The transmitter-receiver 300 provides the control unit 400 via the connection 301 with a signal representative of the distance from the transmitter-receiver 300 to an object V1.

The control unit 400 which, like a battery 500 providing the control unit with energy via the connection 501, may be fixed to the frame 200 calculates therefrom the distance from the object V1 to the point of symmetry and provides the driving motor not shown with a signal related to this distance for moving the motor to a position in which the magnifiers 10 have taken the correct position corresponding to the distance from the object V1 to the point of symmetry. For this purpose a table is stored in a memory of the control unit 400, said table containing the information of the diagram of FIG. 4 in digitized form.

The control device may be designed to control the adjusted convergence point back from remote to closer upon focussing. This is more comfortable to the eye. Moreover, it is thereby obtained that in case of any hysteresis the adjusted convergence distance is greater than the desired distance which is less trying to the eye than when the adjusted convergence distance would be smaller than the desired distance. When the momentarily adjusted point of convergence is closer than the desired point of convergence, the adjusted point of convergence is first controlled to a point more remote than the desired point of convergence and is then controlled back from remote to closer.

Figure 8A:
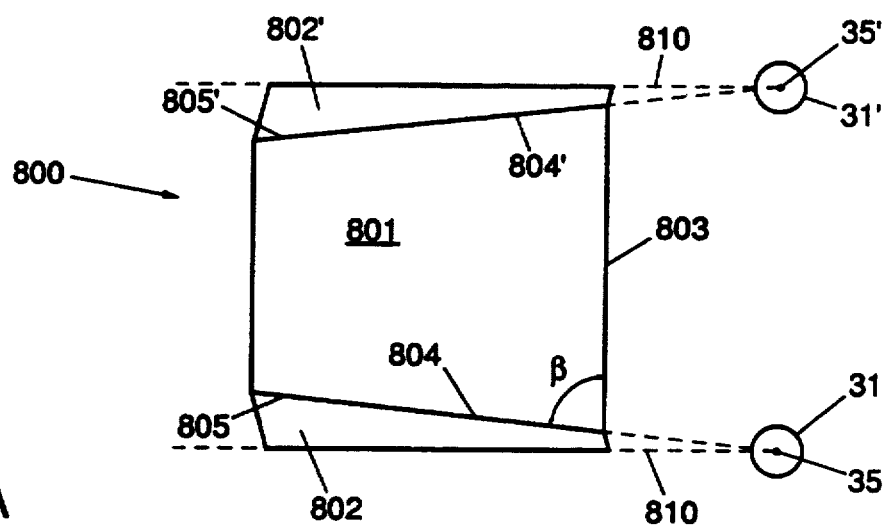
FIGS. 8A–8D are diagrammatic views of another preferred embodiment of the lens system according to the invention.
Figure 8B:
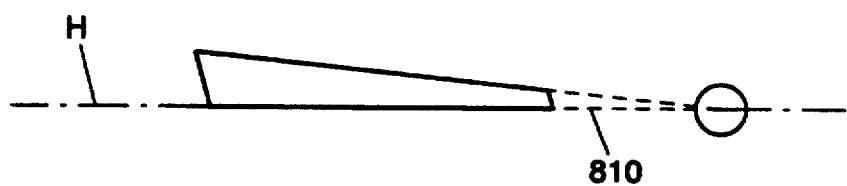
Figure 8C:
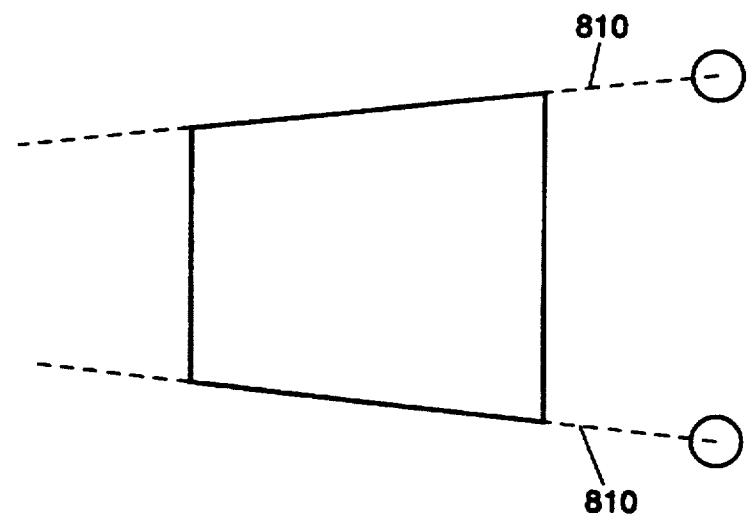
Figure 8D:
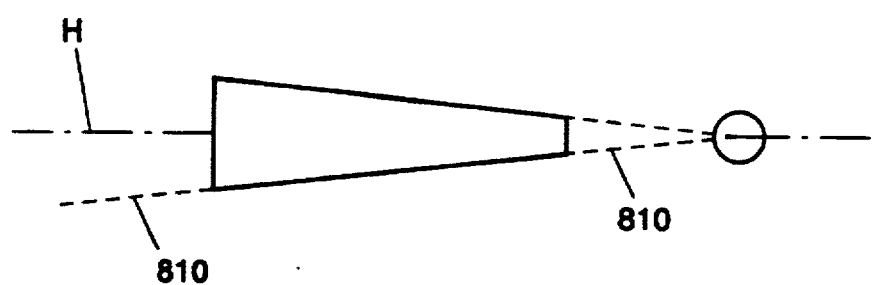

Although the embodiment of the lens system according to the invention as shown in FIG. 6 reaches the main objects of this invention, an improvement may be desirable in the sense that the distance S from the ocular to the eye remains constant at least substantially and that the line of view makes a larger angle with the horizontal as the distance to an object to be viewed is smaller. An embodiment exhibiting these features is shown in FIG. 8, in which FIGS. 8A and 8C show top views and FIGS. 8B and 8D show respective side views.

In the embodiment diagrammatically shown in FIG. 8 the magnifiers 10, which are not shown in FIG. 8 for clearness' sake, are fixed to a fixing frame 800 having a substantially trapezoidal base part 801 and two wing parts 802,802'. FIGS. 8A and 8B show respectively a top view and a side view thereof in the situation that the lens system is used for remote viewing, and FIGS. 8C and 8D show respectively a top view and a side view thereof in the situation that the lens system is used for close viewing. In the given situation the base part 801 is inclined upwards with respect to the horizontal H, preferably through an angle of about 10°, but the base part 801 may also be arranged horizontally.

The base part 801 is fixed firmly to the head by fixing means not shown, such as a headband, with the long base 803 facing the head and being parallel to the line connecting the centres 35 and 35' of the eyes 31 and 31' with each other. The wing parts 802 and 802' are pivoted at their inner sides 804 and 804', respectively, to the inclined sides 805 and 805', respectively, of the base part 801, the pivot axes extending respectively through the centres 35 and 35' of the eyes 31 and 31'. Also, the wing parts 802 and 802' are connected together by connecting pieces not shown in such a manner that their pivotal movement proceeds symmetrically and that their position is always symmetrical with respect to the base part 801.

In the embodiment shown the base part 801 is in one part, the length of the long base 803 being adapted to the real eye separation of the person for whom the lens system is meant. It is known that the eye separation is different from person to person. The most frequently occurring eye separations are within the range of from 58 mm to 71 mm. Preferably, therefore, the base part 801 is in two parts, the first part carrying the wing part 802 and the second part carrying the wing part 802', which two parts can be moved with respect to each other in a direction parallel to the long base 803 and can be fixed together firmly in a chosen position with respect to each other so as to adapt the lens system to the real eye separation of a person in such a manner that the pivot axes extend respectively through the centres of the eyes of this person. Thus the lens system can be used by several persons while it is also more advantageous from a viewpoint of manufacturing technique that no "glasses-to-size" need to be made, but that within the said range the manufacture of one base product is sufficient.

The magnifiers 10 and 10' not shown are fixed to the wing parts 802 and 802', respectively, in such a manner that their optical axes, on the one hand, also extend through the centres 35 and 35' of the eyes 31 and 31', as indicated by the dotted lines 810, and, on the other hand, are horizontal and parallel in direction with each other in a first predetermined position of the wing pares 802 and 802', respectively, with respect to the base part 801. This first predetermined position is the position in which the lens system is used for remote viewing, i.e. at a distance greater than or equal to 3 m, as illustrated by FIGS. 8A and 8B.

The above structure ensures that the optical axes of the magnifiers 10 and 10' always extend through the centres 35 and 35' of the eyes 31 and 31', regardless of the position of the wing parts 802 and 802' with respect to the base part 801. It will be clear that when the ocular parts of the magnifiers are fixed firmly with respect to the wing parts 802 and 802', the distance from the ocular parts to the respective eye is always constant, regardless of the position of the wing parts 802 and 802' with respect to the base part 801.

When the object to be viewed is closer than 3 m, the optical axes of the magnifiers 10 and 10' must appreciably converge. To this end, the position of the wing parts 802 and 802' is changed with respect to the base part 801. The closer the object, the more the position of the wing parts 802 and 802' departs from the said first predetermined position so that the optical axes of the magnifiers 10 and 10' converge more and more while, moreover, the optical axes of the magnifiers 10 and 10' make an increasingly large angle with the horizontal H. In the situation shown in FIGS. 8C and 8D for close viewing the wing parts 802 and 802', respectively, are in a second predetermined position with respect to the base part 801 while the optical axes of the magnifiers 10 and 10' define vertical planes with the respective pivotal axes defined by the sides 804, 805 and 804', 805'. FIG. 8D clearly shows that the optical axes are directed downwards with respect to the horizontal H, as indicated by the dotted line 810. FIG. 8C shows that the convergence distance of the optical axes is then defined by the distance between the centres 35 and 35' of the eyes 31 and 31', on the one hand, and the angle $\beta$ between the long base 803 and the slanting sides 805 and 805' of the base parts 801, on the other hand. For the purpose of illustration, if the lens system is to be suitable for a person whose eye separation is 71 mm and the convergence distance is to be about 20 cm at said second predetermined position, $\beta$ must be approximately equal to 80°.

Figure 9A:
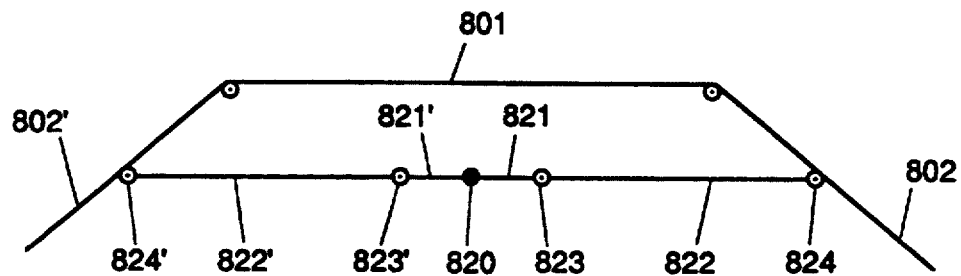
FIGS. 9A–9B are diagrammatic front views of the lens system of FIG. 8.
Figure 9B:
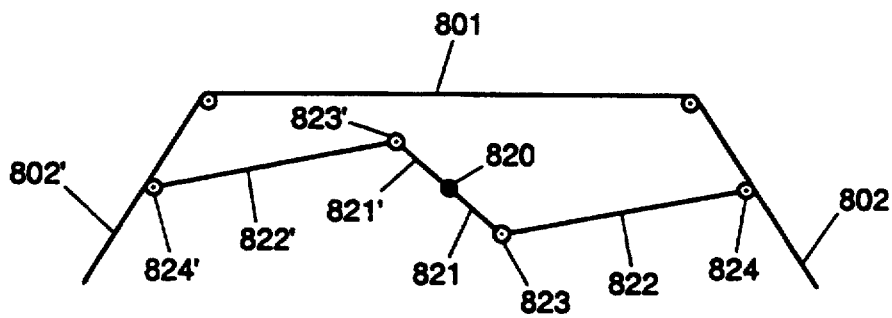

The position of the wing parts 802,802' with respect to the base part 801 can be achieved by any suitable means under control of the control device. In the embodiment shown in FIGS. 9A–B by way of example the displacement transferring means comprise a connecting shaft 820 connected to the power output shaft of the motor (optionally via a speed reducing mechanism), which connecting shaft is not shown in the figure and is mounted rotatably about its longitudinal axis to the base part 801 of the fixing frame, otherwise in a known per se manner. The longitudinal axis of the connecting shaft 820 is located in the vertical plane of symmetry of the fixing frame 800 and is preferably parallel in direction with the base part 801. Rigidly fixed to the connecting shaft 820 are two first connecting arms 821,821', which connecting arms 821,821' are in line with each other, preferably in a plane perpendicular to the connecting shaft 820. Pivoted to the free ends of the first connecting arms 821 and 821' and second connecting arms 822 and 822', respectively, by means of pivots 823 and 823'. The second connecting arms 822 and 822' are, in turn, pivoted to respectively the wing parts 802 and 802' by means of pivots 824 and 824'. It will be clear that a specific position of the motor shaft thus corresponds with a specific position of the wing parts 802 and 802'. FIGS. 9A diagrammatically shows a front view of the above-described construction in the situation that the wing parts 802 and 802' are in the first predetermined position. FIG. 9B diagrammatically shows a situation in which the wing parts 802 and 802' are turned inwards and are in an intermediate position.

The desired position of the motor shaft can then be calculated by the control device on the basis of signals provided by the displacement transferring means by means of a formula and/or table stored in a memory of the control device for bringing the wing parts 802,802' directly into the desired position, but the control device can also control the convergence on the basis of a control measurement.

Figure 10:
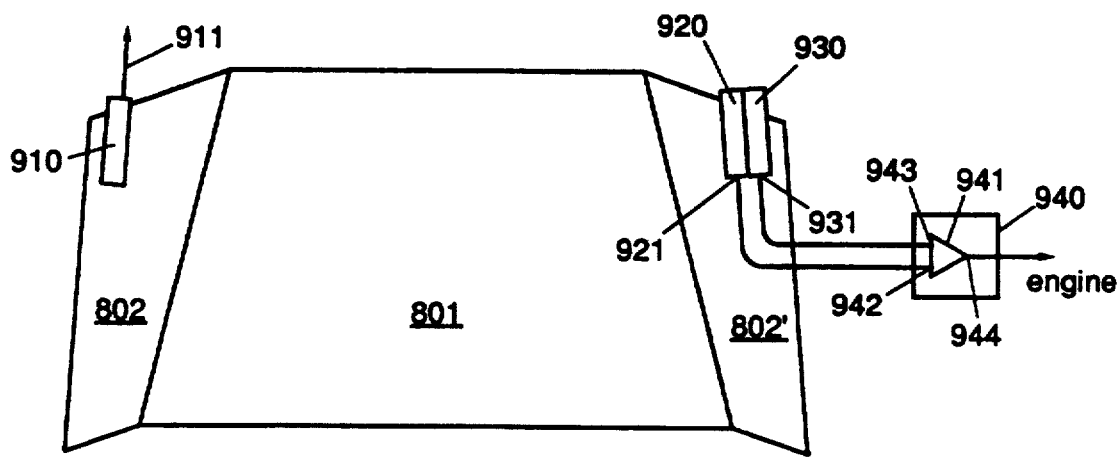
FIG. 10 is a diagrammatic top view of the lens system of FIG. 8, provided with means for detecting a correct convergence.

FIG. 10 diagrammatically shows a top view of such an embodiment. A light source 910 is fixed to one of the wing parts 802. The light source 910 is designed to emit a light beam 911 parallel to the optical axis of the magnifier 10 fixed to the wing part 802. The light beam 911 provides a light spot on an object to be viewed. The light used may be infrared light or visible light, the use of visible light having the advantage that the user of the system according to this invention can see on what object there is focussed.

Fixed to the other wing part 802' are two light detectors 920 and 930 right beside each other. The light detectors 920 and 930 are designed to detect light reaching the respective light detector in a direction parallel to the optical axis of the magnifier 10' fixed to the wing part 802'. The light detectors 920 and 930 provide at their respective outputs 921 and 931 a signal representative of the amount of light received by the relevant light detector. When the convergence is correctly adjusted to the object to be viewed, the two light detectors 920 and 930 receive an equal amount of light from the light spot projected onto the object so that at their respective outputs the signals 921 and 931 are equal to each other. When the signal strengths of the light detectors 920 and 930 are not equal at equal amounts of incident light, this may be compensated for in a known per se manner.

The control unit 940 comprises a difference measuring means 941 of which two inputs 942 and 943 are connected to the outputs 921 and 931 of the light detectors 920 and 930. At an output 944 the difference measuring means 941 provides a signal indicative of the difference in the light intensities measured by the light detectors 920 and 930. In an advantageous embodiment the difference measuring means 941 is a differential amplifier and the control unit 940 further comprises a control circuit for controlling the motor and therefore displacing the two wing parts 802 and 802' in such a manner that the output signal of the differential amplifier 941 is substantially zero. Thus it is achieved in any case that the convergence of the two magnifiers is correctly adjusted.

In order to eliminate the influence of ambient light, the receiver may be provided with a filter. It is also possible to use pulsated light, with a difference measurement being conducted in the receiver between the detected light in the situation "puls on" and the detected light in the situation "puls out", respectively. The difference signal thus obtained is representative of the amount of light received originating from the reflected light pulse. Such a difference signal can be easily obtained by only transferring of the output signal of the detector the AC component to the differential amplifier.

When adjusting the right axial position of the objective with respect to the ocular in order to focus the magnifier on the right distance, use is made, as in the embodiment shown in FIG. 6, of the fact that the objective only has an axial degree of freedom with respect to the ocular. There may be used the construction shown in FIG. 6 for the axial displacement of the objective in response to a converging displacement of the magnifier. Alternatively, a connecting piece may be fixed to the base part 801, of which a connecting part has a shape corresponding to the desired "path" of the objective with respect to the base part 801. By means of a resilient member the objective is pretensioned in the direction of the ocular whereby it is drawn with a connecting part thereof against the connecting part of the connecting piece. When turning the wing parts 802,802' the connecting part of the objective, and thereby the objective itself, is forced to follow the "path" defined by the connecting part of the connecting piece so that the objective is displaced in the axial direction with respect to the ocular in such a manner that the focussing of the magnifier always corresponds to the convergence thereof. It is then preferred to manufacture the two connecting parts from a long wearing material so as to avoid adjustment deviations owing to frictional wear.

When, e.g. owing to mechanical play and/or tolerance, the adjusted sharpness and/or convergence is not exact, this is no great drawback while a not quite correctly adjusted sharpness is experienced by the eye as less unpleasant and/or trying than a not quite correctly adjusted convergence. Furthermore, within the most frequently occurring range of application of from 0 to 3 m, a minor deviation in the mechanical adjustment does not greatly influence the effectively adjusted sharpness distance. On the other hand, the eye itself has the ability to correct minor errors in sharpness and/or convergence.

It will be clear that the invention is not restricted to the embodiment shown in the figures. Thus it is possible to move the position of the guide pin and the guide slot with respect to the objective holder 13 to obtain a more compact assembly, and the guide pin 141 need not be in line with the axes 119 and 129. Furthermore, an objective and/or an ocular may consist of more than one lens. Moreover, the telescoping movement of the magnifiers may be controlled by the driving means, the converging movement of the magnifiers being effected by connecting members such as a guide pin in a guide slot.

It is also possible to fix the distance measuring means not to the magnifiers themselves but to the frame of the lens system in the plane of symmetry. The transmitter may then be fixed firmly to the frame, and the detector may be designed to tilt in the vertical sense, which tilting movement may be controlled, e.g. by a control cam connected to the driving means.

Finally, it is observed that the magnifiers may be designed to correct visual defects, i.e. persons wearing glasses can suitably use them, instead of their normal glasses.

I claim:

1. A lens system comprising a frame that fixes to a head of a user of the lens system and associated therewith are:
   a) first and second magnifiers that are movable with respect to each other and with respect to the frame; in which
      i) the first magnifier has a first ocular and a first objective, and the second magnifier has a second ocular and a second objective wherein each magnifier being associable with its own relevant eye;
      ii) the first and second magnifiers are associated with a distance measuring means for measuring the distance from the user to an object to be viewed by the user and providing a control unit connected thereto with a signal representative of said distance;
   b) driving means connected to the control unit whereby the control unit provides the driving means with a control signal in response to the signal received from the distance measuring means; and
   c) first displacement transferring means connected to the driving means for displacing the first and the second objective with respect to the first and the second ocular so that the focal length of each magnifier is adapted to the distance measured by said distance measuring means and the object can be sharply viewed by the user by means of each of the magnifiers; and d) second displacement transferring means arranged for displacing the first and second magnifiers with respect to each other and with respect to the frame in response to said signal provided by the distance measuring means in such a manner that the optical axes of the magnifiers which extend substantially through the optical center of the relevant eye, intersect each other at the distance measured by the distance measuring means.

2. The lens system of claim 1, wherein the converging displacement of the magnifiers is such that the distance from each ocular to the relevant eye is kept substantially constant.

3. The lens system of claim 1, wherein the converging displacement of the magnifiers is combined with a downwardly turning displacement of the magnifiers relative to the frame.

4. The lens system of claim 2, wherein the converging displacement of the magnifiers is combined with a downwardly turning displacement of the magnifiers relative to the frame.

5. The lens system of claim 1, wherein the control unit has a momentary convergence distance decrease to a desired convergence distance upon focusing.

6. The lens system of claim 2, wherein the control unit has a momentary convergence distance decrease to a desired convergence distance upon focusing.

7. The lens system of claim 3, wherein the control unit has a momentary convergence distance decrease to a desired convergence distance upon focusing.

8. The lens system of claim 4, wherein the control unit has a momentary convergence distance decrease to a desired convergence distance upon focusing.

9. The lens system of claim 1, wherein the driving means for the focusing displacement and the driving means for the converging displacement have at least some parts in common.

10. The lens system of claim 2, wherein the driving means for the focusing displacement and the driving means for the converging displacement have at least some parts in common.

11. The lens system of claim 3, wherein the driving means for the focusing displacement and the driving means for the converging displacement have at least some parts in common.

12. The lens system of claim 4, wherein the driving means for the focusing displacement and the driving means for the converging displacement have at least some parts in common.

13. The lens system of claim 5, wherein the driving means for the focusing displacement and the driving means for the converging displacement have at least some parts in common.

14. The lens system of claim 6, wherein the driving means for the focusing displacement and the driving means for the converging displacement have at least some parts in common.

15. The lens system of claim 7, wherein the driving means for the focusing displacement and the driving means for the converging displacement have at least some parts in common.

16. The lens system of claim 8, wherein the driving means for the focusing displacement and the driving means for the converging displacement have at least some parts in common.

17. The lens system of claim 9, wherein the first displacement transferring means for focusing and the second displacement transferring means for converging are separately connected to the driving means.

18. The lens system of claim 9, wherein the second displacement transferring mean for converging are directly connected to the driving means and that the first displacement transferring means for focusing are designed to derive the axial movement of the objective with respect to the ocular required for focusing from the converging angular displacement of the magnifiers.

19. The lens system of claim 1 wherein the mutual distance of the two magnifiers is adjustable within the range of from 58 mm to 71 mm.

20. The lens system of claim 2 wherein the mutual distance of the two magnifiers is adjustable within the range of from 58 mm to 71 mm.

21. The lens system of claim 3 wherein the mutual distance of the two magnifiers is adjustable within the range of from 58 mm to 71 mm.

22. The lens system of claim 4 wherein the mutual distance of the two magnifiers is adjustable within the range of from 58 mm to 71 mm.

23. The lens system of claim 5 wherein the mutual distance of the two magnifiers is adjustable within the range of from 58 mm to 71 mm.

24. The lens system of claim 5 wherein the mutual distance of the two magnifiers is adjustable within the range of from 58 mm to 71 mm.

25. The lens system of claim 2 wherein the mutual distance of the two magnifiers is adjustable within the range of from 58 mm to 71 mm.

26. The lens system of claim 8 wherein the mutual distance of the two magnifiers is adjustable within the range of from 58 mm to 71 mm.

27. The lens system of claim 9 wherein the mutual distance of the two magnifiers is adjustable within the range of from 58 mm to 71 mm.

28. The lens system of claim 10 wherein the mutual distance of the two magnifiers is adjustable within the range of from 58 mm to 71 mm.

29. The lens system of claim 11 wherein the mutual distance of the two magnifiers is adjustable within the range of from 58 mm to 71 mm.

30. The lens system of claim 12 wherein the mutual distance of the two magnifiers is adjustable within the range of from 58 mm to 71 mm.

31. The lens system of claim 13 wherein the mutual distance of the two magnifiers is adjustable within the range of from 58 mm to 71 mm.

32. The lens system of claim 14 wherein the mutual distance of the two magnifiers is adjustable within the range of from 58 mm to 71 mm.

33. The lens system of claim 15 wherein the mutual distance of the two magnifiers is adjustable within the range of from 58 mm to 71 mm.

34. The lens system of claim 16 wherein the mutual distance of the two magnifiers is adjustable within the range of from 58 mm to 71 mm.

35. The lens system of claim 17 wherein the mutual distance of the two magnifiers is adjustable within the range of from 58 mm to 71 mm.

36. The lens system of claim 18 wherein the mutual distance of the two magnifiers is adjustable within the range of from 58 mm to 71 mm.

37. The lens system of claim 1 wherein the distance measuring means comprise an ultrasonic transmitter and an ultrasonic receiver.

38. The lens system of claim 9 wherein the distance measuring means comprise an ultrasonic transmitter and an ultrasonic receiver.

39. The lens system of claim 37, wherein the ultrasonic transmitter and the ultrasonic receiver are movable with respect to each other and with respect to the frame and that the movements of the ultrasonic transmitter and the ultrasonic receiver are connected to the movements of the first and the second magnifier.

40. The lens system of claim 38, wherein the ultrasonic transmitter and the ultrasonic receiver are movable with respect to each other and with respect to the frame and that the movements of the ultrasonic transmitter and the ultrasonic receiver are connected to the movements of the first and the second magnifier.

41. The lens system of claim 39, wherein the ultrasonic transmitter is fixed to one of the two magnifiers and that the ultrasonic receiver is fixed to the other of the two magnifiers.

42. The lens system of claim 40, wherein the ultrasonic transmitter is fixed to one of the two magnifiers and that the ultrasonic receiver is fixed to the other of the two magnifiers.

43. The lens system of claims 1, wherein the distance measuring means comprise a light transmitter and a light detector, said light detector providing an output signal representative of the amount of light received by said light detector.

44. The lens system of claims 9, wherein the distance measuring means comprise a light transmitter and a light detector, said light detector providing an output signal representative of the amount of light received by said light detector.

45. The lens system of claim 43, wherein the light transmitter transmits visible light.

46. The lens system of claim 44, wherein the light transmitter transmits visible light.

47. The lens system of claim 45 wherein the receiver is provided with a filter.

48. The lens system of claim 46 wherein the receiver is provided with a filter.

49. The lens system of claims 45, wherein the light transmitter transmits pulsed light.

50. The lens system of claims 46, wherein the light transmitter transmits pulsed light.

51. The lens system of claims 47, wherein the light transmitter transmits pulsed light.

52. The lens system of claims 48, wherein the light transmitter transmits pulsed light.

53. The lens system of claims 45, wherein the lens system is provided with two detectors mounted close to each other and in parallel with each other, with a sensitivity axis parallel in direction with the optical axis of one of the two magnifiers and a light source suitable for emitting a light beam with a beam axis parallel in direction with the optical axis of the other of the two magnifiers; that the control unit comprises a difference measuring means for measuring the difference of the output signals of the two detectors; and that the control unit is designed to displace the magnifiers via the driving means until the measured difference of the output signals of the two detectors is minimal.

54. The lens system of claims 46, wherein the lens system is provided with two detectors mounted close to each other and in parallel with each other, with a sensitivity axis parallel in direction with the optical axis of one of the two magnifiers and a light source suitable for emitting a light beam with a beam axis parallel in direction with the optical axis of the other of the two magnifiers; that the control unit comprises a difference measuring means for measuring the difference of the output signals of the two detectors: and that the control unit is designed to displace the magnifiers via the driving means until the measured difference of the output signals of the two detectors is minimal.

55. The lens system of claims 47, wherein the lens system is provided with two detectors mounted close to each other and in parallel with each other, with a sensitivity axis parallel in direction with the optical axis of one of the two magnifiers and a light source suitable for emitting a light beam with a beam axis parallel in direction with the optical axis of the other of the two magnifiers; that the control unit comprises a difference measuring means for measuring the difference of the output signals of the two detectors; and that the control unit is designed to displace the magnifiers via the driving means until the measured difference of the output signals of the two detectors is minimal.

56. The lens system of claims 48, wherein the lens system is provided with two detectors mounted close to each other and in parallel with each other, with a sensitivity axis parallel in direction with the optical axis of one of the two magnifiers and a light source suitable for emitting a light beam with a beam axis parallel in direction with the optical axis of the other of the two magnifiers; that the control unit comprises a difference measuring means for measuring the difference of the output signals of the two detectors; and that the control unit is designed to displace the magnifiers via the driving means until the measured difference of the output signals of the two detectors is minimal.

57. The lens system of claims 49, wherein the lens system is provided with two detectors mounted close to each other and in parallel with each other, with a sensitivity axis parallel in direction with the optical axis of one of the two magnifiers and a light source suitable for emitting a light beam with a beam axis parallel in direction with the optical axis of the other of the two magnifiers; that the control unit comprises a difference measuring means for measuring the difference of the output signals of the two detectors; and that the control unit is designed to displace the magnifiers via the driving means until the measured difference of the output signals of the two detectors is minimal.

58. The lens system of claims 50, wherein the lens system is provided with two detectors mounted close to each other and in parallel with each other, with a sensitivity axis parallel in direction with the optical axis of one of the two magnifiers and a light source suitable for emitting a light beam with a beam axis parallel in direction with the optical axis of the other of the two magnifiers; that the control unit comprises a difference measuring means for measuring the difference of the output signals of the two detectors; and that the control unit is designed to displace the magnifiers via the driving means until the measured difference of the output signals of the two detectors is minimal.

59. The lens system of claims 51, wherein the lens system is provided with two detectors mounted close to each other and in parallel with each other, with a sensitivity axis parallel in direction with the optical axis of one of the two magnifiers and a light source suitable for emitting a light beam with a beam axis parallel in direction with the optical axis of the other of the two magnifiers; that the control unit comprises a difference measuring means for measuring the difference of the output signals of the two detectors; and that the control unit is designed to displace the magnifiers via the driving means until the measured difference of the output signals of the two detectors is minimal.

60. The lens system of claims 52, wherein the lens system is provided with two detectors mounted close to each other and in parallel with each other, with a sensitivity axis parallel in direction with the optical axis of one of the two magnifiers and a light source suitable for emitting a light beam with a beam axis parallel in direction with the optical axis of the other of the two magnifiers; that the control unit comprises a difference measuring means for measuring the difference of the output signals of the two detectors; and that the control unit is designed to displace the magnifiers via the driving means until the measured difference of the output signals of the two detectors is minimal.

61. The lens system of claim 1, wherein the frame comprises a trapezoidal base part and two wing parts pivotally mounted to the slanting sides of the trapezoidal base part; and that the magnifiers are each fixed to a wing part in such a manner that the optical axis of each magnifier intersects the respective pivotal axis in a point suitable for coinciding, during operation, with the center of a respective eye.

62. The lens system of claim 9, wherein the frame comprises a trapezoidal base part and two wing parts pivotally mounted to the slanting sides of the trapezoidal base part; and that the magnifiers are each fixed to a wing part in such a manner that the optical axis of each magnifier intersects the respective pivotal axis in a point suitable for coinciding, during operation, with the center of a respective eye.

63. The lens system of claim 61, wherein the working position of the trapezoidal base part is inclined with respect to the horizontal.

64. The lens system of claim 61, wherein the working position of the trapezoidal base part is inclined with respect to the horizontal.

65. The lens system of claim 63, wherein in the inclination angle is about 10°.

66. The lens system of claim 64, wherein in the inclination angle is about 10°.

67. The lens system of claim 61 wherein the trapezoidal base part is in two parts, the first part carrying the first wing part and the second part carrying the second wing part, which two parts of the trapezoidal base part can be moved with respect to each other in a direction parallel to the long base of the trapezoidal base part and can be fixed firmly in a chosen position with respect to each other.

68. The lens system of claim 62 wherein the trapezoidal base part is in two parts, the first part carrying the first wing part and the second part carrying the second wing part, which two parts of the trapezoidal base part can be moved with respect to each other in a direction parallel to the long base of the trapezoidal base part and can be fixed firmly in a chosen position with respect to each other.

69. The lens system of claim 63 wherein the trapezoidal base part is in two parts, the first part carrying the first wing part and the second part carrying the second wing part, which two parts of the trapezoidal base part can be moved with respect to each other in a direction parallel to the long base of the trapezoidal base part and can be fixed firmly in a chosen position with respect to each other.

70. The lens system of claim 64 wherein the trapezoidal base part is in two parts, the first part carrying the first wing part and the second part carrying the second wing part, which two parts of the trapezoidal base part can be moved with respect to each other in a direction parallel to the long base of the trapezoidal base part and can be fixed firmly in a chosen position with respect to each other.

71. The lens system of claim 65 wherein the trapezoidal base part is in two parts, the first part carrying the first wing part and the second part carrying the second wing part, which two parts of the trapezoidal base part can be moved with respect to each other in a direction parallel to the long base of the trapezoidal base part and can be fixed firmly in a chosen position with respect to each other.

72. The lens system of claim 66 wherein the trapezoidal base part is in two parts, the first part carrying the first wing part and the second part carrying the second wing part, which two parts of the trapezoidal base part can be moved with respect to each other in a direction parallel to the long base of the trapezoidal base part and can be fixed firmly in a chosen position with respect to each other.

73. A lens system as claimed in at least one of claims 61, wherein the angle between the long of the trapezoidal base part and the slanting sides of the trapezoidal base part is approximately equal to 80°.

74. A lens system as claimed in at least one of claims 62, wherein the ingle between the long of the trapezoidal base part and the slanting sides of the trapezoidal base part is approximately equal to 80°.

75. A lens system as claimed in at least one of claims 63, wherein the angle between the long of the trapezoidal base part and the slanting sides of the trapezoidal base part is approximately equal to 80°.

76. A lens system as claimed in at least one of claims 64, wherein the angle between the long of the trapezoidal base part and the slanting sides of the trapezoidal base part is approximately equal to 80°.

77. A lens system as claimed in at least one of claims 65, wherein the angle between the long of the trapezoidal base part and the slanting sides of the trapezoidal base part is approximately equal to 80°.

78. A lens system as claimed in at least one of claims 66, wherein the angle between the long of the trapezoidal base part and the slanting sides of the trapezoidal base part is approximately equal to 80°.

79. A lens system as claimed in at least one of claims 67, wherein the angle between the long of the trapezoidal base part and the slanting sides of the trapezoidal base part is approximately equal to 80°.

80. A lens system as claimed in at least one of claims 68, wherein the angle between the long of the trapezoidal base part and the slanting sides of the trapezoidal base part is approximately equal to 80°.

81. A lens system as claimed in at least one of claims 69, wherein the angle between the long of the trapezoidal base part and the slanting sides of the trapezoidal base part is approximately equal to 80°.

82. A lens system as claimed in at least one of claims 70, wherein the angle between the long of the trapezoidal base part and the slanting sides of the trapezoidal base part is approximately equal to 80°.

83. A lens system as claimed in at least one of claims 71, wherein the angle between the long of the trapezoidal base part and the slanting sides of the trapezoidal base part is approximately equal to 80°.

84. A lens system as claimed in at least one of claims 72, wherein the angle between the long of the trapezoidal base part and the slanting sides of the trapezoidal base part is approximately equal to 80°.

* * * * *

UNITED STATES PATENT AND TRADEMARK OFFICE
CERTIFICATE OF CORRECTION

PATENT NO. : 5,374,820
DATED : December 20, 1994
INVENTOR(S) : Ernst J. Haaksman It is certified that error appears in the above-indentified patent and that said Letters Patent is hereby corrected as shown below:

In column 14, line 29, in claim 24, change "5" to read ---6---.

In column 14, line 32, in claim 25, change "2" to read ---7---.

In column 17, line 38, in claim 64, change "61" to read ---62---.

Signed and Sealed this

Fourteenth Day of March, 1995

*Attest:*

BRUCE LEHMAN

*Attesting Officer*     *Commissioner of Patents and Trademarks*